US012608114B2

(12) United States Patent
Li

(10) Patent No.: US 12,608,114 B2
(45) Date of Patent: Apr. 21, 2026

(54) METHOD FOR CONTROLLING MODEL WITH MODEL ADJUSTMENT EXECUTED ON THE SERVER SIDE, DEVICE AND SYSTEM, AND COMPUTER STORAGE MEDIUM

(71) Applicant: BOE Technology Group Co., Ltd., Beijing (CN)

(72) Inventor: Cunqing Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 314 days.

(21) Appl. No.: 18/271,866

(22) PCT Filed: Jul. 29, 2022

(86) PCT No.: PCT/CN2022/109021
§ 371 (c)(1),
(2) Date: Jul. 12, 2023

(87) PCT Pub. No.: WO2024/021036
PCT Pub. Date: Feb. 1, 2024

(65) Prior Publication Data
US 2024/0385724 A1 Nov. 21, 2024

(51) Int. Cl.
*G06F 3/04815* (2022.01)
*G06F 3/04847* (2022.01)

(52) U.S. Cl.
CPC ...... *G06F 3/04815* (2013.01); *G06F 3/04847* (2013.01)

(58) Field of Classification Search
CPC ... G06F 3/04815; G06F 3/04847; G06F 3/048
See application file for complete search history.

(56) References Cited

U.S. PATENT DOCUMENTS

| | | | | |
|---|---|---|---|---|
| 10,068,316 | B1* | 9/2018 | Holzer | G06T 11/001 |
| 10,872,535 | B2* | 12/2020 | Yang | H04L 12/18 |
| 2010/0115455 | A1* | 5/2010 | Kim | G06F 3/04845 |
| | | | | 345/173 |
| 2014/0368499 | A1 | 12/2014 | Kaur | |
| 2015/0262423 | A1* | 9/2015 | Heinz, II | H04N 21/23412 |
| | | | | 386/241 |
| 2017/0221371 | A1* | 8/2017 | Yang | G06Q 50/20 |
| 2017/0330336 | A1* | 11/2017 | Roblek | G06F 16/434 |
| 2017/0371486 | A1* | 12/2017 | Neiswander | G06F 3/0488 |
| 2020/0259931 | A1 | 8/2020 | Ding et al. | |
| 2020/0302693 | A1 | 9/2020 | Singh et al. | |

FOREIGN PATENT DOCUMENTS

| | | |
|---|---|---|
| CN | 103400543 A | 11/2013 |
| CN | 114579229 A | 6/2022 |
| JP | 3212833 U | 10/2017 |
| WO | 2021169431 A1 | 9/2021 |

* cited by examiner

*Primary Examiner* — Kenny Nguyen
(74) *Attorney, Agent, or Firm* — IPro, PLLC

(57) ABSTRACT

Provided is a method for controlling a model. The method includes: sending, by a server, video data of a model to a terminal; sending, by the terminal, control information for the video data to the server; adjusting the model and sending video data of an adjusted model to the terminal by the server; and displaying the video data by the terminal.

16 Claims, 8 Drawing Sheets

METHOD FOR CONTROLLING MODEL WITH MODEL ADJUSTMENT EXECUTED ON THE SERVER SIDE, DEVICE AND SYSTEM, AND COMPUTER STORAGE MEDIUM

CROSS-REFERENCE TO RELATED APPLICATION

This application is a U.S. national stage of international application No. PCT/CN2022/109021, filed on Jul. 29, 2022, the disclosure of which is herein incorporated by reference in its entirety.

TECHNICAL FIELD

The present disclosure relates to the field of information technologies, and in particular, relates to a method for controlling a model, device and system, and a computer storage medium.

BACKGROUND

With developments of technologies, various methods for displaying information are utilized, and a method using a controllable model is an intuitive method for displaying information.

SUMMARY

Embodiments of the present disclosure provide a method for controlling a model, device and system, and a computer storage medium. The technical solutions are as follows.

According to one aspect of the embodiments of the present disclosure, a method for controlling a model is provided. The method is applicable to a terminal. The method includes: receiving and displaying video data of a model provided by a server; acquiring control information for the video data; sending the control information to the server, wherein the server is configured to adjust the model based on the control information; and receiving and displaying video data of an adjusted model provided by the server.

In some embodiments, wherein acquiring the control information for the video data includes: acquiring operation information; determining a current control mode of the terminal, wherein the control mode at least includes a mouse control mode and a touch control mode, both the mouse control mode and the touch control mode including a corresponding relationship between an operation information and a control information; and converting the operation information into the control information based on the corresponding relationship included in the current control mode of the terminal.

In some embodiments, the control information includes at least two control instructions, and the converting the operation information into the control information based on the corresponding relationship included in the current control mode of the terminal includes: determining, based on the corresponding relationship included in the current control mode of the terminal, whether the operation information corresponds to a first control instruction in the at least two control instructions; in response to the operation information corresponding to the first control instruction, converting the operation information into the first control instruction; in response to the operation information not corresponding to the first control instruction, determining whether the operation information corresponds to a second control instruction in the at least two control instructions; and in response to the operation information corresponding to the second control instruction, converting the operation information into the second control instruction.

In some embodiments, the control information includes at least two control instructions of single click, double click, view angle translation, view angle scaling, and view angle change.

In some embodiments, wherein determining the current control mode of the terminal includes: determining whether a position corresponding to the operation information belongs to a designated region; in response to a case that the position corresponding to the operation information does not belong to the designated region, determining the current control mode of the terminal as the touch control mode; and in response to the position corresponding to the operation information belonging to the designated region, determining the current control mode of the terminal as the mouse control mode.

In some embodiments, wherein receiving and displaying the video data of the model provided by the server includes: receiving the video data of the model provided by the server; and playing the video data of the model through a local player component.

According to another aspect of the embodiments of the present disclosure, a method for controlling a model is provided. The method is applicable to a server. The method includes: running a model; acquiring video data of the model; sending the video data to a terminal; receiving control information for the model provided by the terminal; adjusting the model based on the control information; acquiring video data of an adjusted model; and sending the video data of the adjusted model to the terminal.

In some embodiments, wherein the model is a three-dimensional model, and the running the model includes: running the model by a three-dimensional model running component.

In some embodiments, wherein the server receives the control information from a plurality of terminals, and the terminals at least includes a first terminal and a second terminal, and the adjusting the model based on the control information includes: adjusting the model based on first control information provided by the first terminal and second control information provided by the second terminal.

In some embodiments, wherein the first terminal and the second terminal are terminals of different operating systems.

According to another aspect of the embodiments of the present disclosure, a system for controlling a model is provided. The system includes: a terminal and a server.

The server is configured to run a model.

The server is further configured to acquire video data of the model.

The server is further configured to send the video data to the terminal.

The terminal is configured to receive and display the video data of the model provided by the server.

The terminal is further configured to acquire control information for the video data.

The terminal is further configured to send the control information to the server.

The server is further configured to receive the control information for the model provided by the terminal.

The server is further configured to adjust the model based on the control information.

The server is further configured to acquire video data of an adjusted model.

The server is further configured to send the video data of the adjusted model to the terminal.

The terminal is further configured to receive and display the video data of the adjusted model provided by the server.

According to another aspect of the embodiments of the present disclosure, a device for controlling a model is provided. The device includes a processor and a memory storing at least one instruction, at least one program, a code set, or an instruction set therein. The at least one instruction, the at least one program, the code set, or the instruction set, when loaded and executed by the processor, causes the processor to achieve the above method for controlling the model.

According to another aspect of the embodiments of the present disclosure, a non-transitory computer storage medium is provided. The non-transitory computer storage medium stores at least one instruction, at least one program, a code set, or an instruction set therein, wherein the at least one instruction, the at least one program, the code set, or the instruction set, when loaded and executed by a processor, causes the processor to achieve the above method for controlling the model.

BRIEF DESCRIPTION OF THE DRAWINGS

For clearer descriptions of the technical solutions according to the embodiments of the present disclosure, accompanying drawings required in the description of the embodiments are briefly introduced below. It is obvious that the accompanying drawings in the description below are only some embodiments of the present disclosure, and for those skilled in the art, other accompanying drawings are able to be obtained according to these accompanying drawings without creative efforts.

The above accompanying drawings have shown the explicit embodiments of the present disclosure, which are described below in detail. These accompanying drawings and text descriptions are not intended to limit scope of a conception of the present disclosure, but to illustrate a concept of the present disclosure to those skilled in the art with reference to specific embodiments.

DETAILED DESCRIPTION

For clearer descriptions of the objects, technical solutions, and advantages of the present disclosure, the embodiments of the present disclosure are further described in detail below with reference to the accompanying drawings.

A method for displaying information to a user is to establish a model based on to-be-displayed information and display the model to the user. The user controls the model, such as performing selection, view angle scaling, and view angle translation. The user comprehensively and clearly acquires relevant information through the model.

However, a requirement of the model running on the computing capacity is high, and in the case that the computing capacity of a device for running the model is weak, the model running is relatively unsmooth, which greatly affects the user experience.

In a current method for controlling a model, a terminal runs a model (such as a house model or a vehicle model), displays a running process of the model on a display interface, then receives a control instruction of a user, and adjusts the model based on the control instruction, such that the user can see an adjusted model through the display interface.

However, in the case that the model is complicated, the running process of the model is relatively unsmooth due to the limited function of the terminal, which results in low control efficiency of the above method.

The embodiments of the present disclosure provide a method and apparatus for controlling a model, device and system, and a computer storage medium, which solve some problems in the related art.

Figure 1:
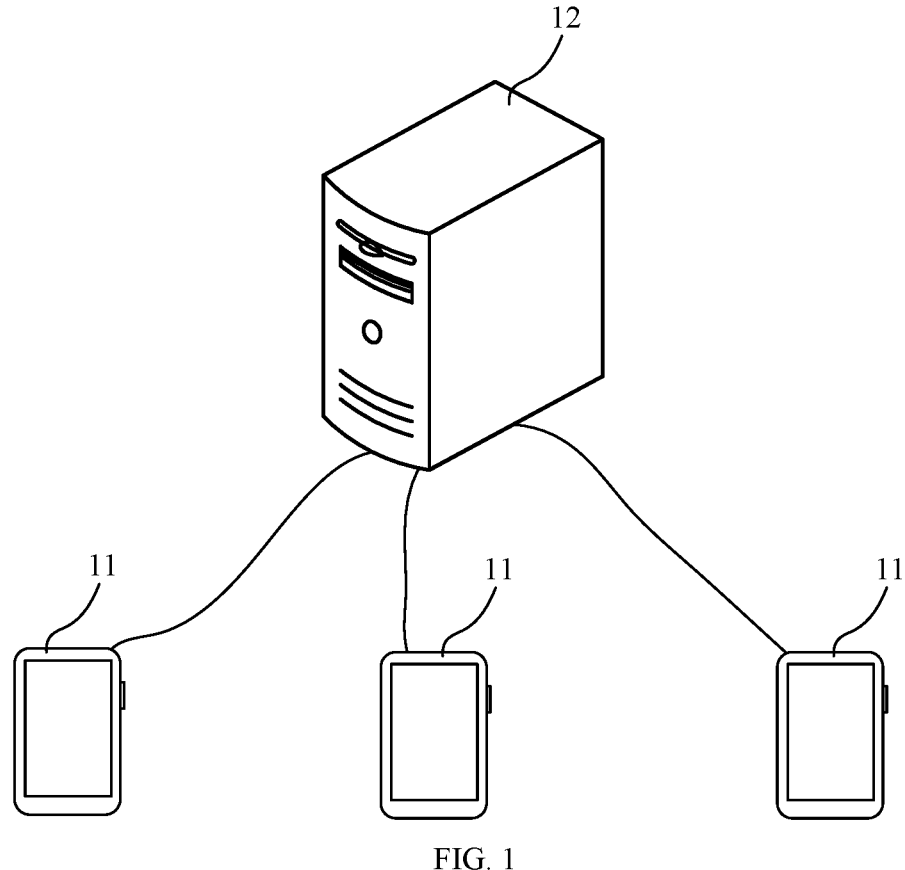
FIG. 1 is a schematic diagram of a structure of an application scenario according to some embodiments of the present disclosure.

Referring to FIG. 1, FIG. 1 is a schematic diagram of a structure of an application scenario according to some embodiments of the present disclosure. The application scenario includes terminals 11 and a server 12. The terminals 11 are configured to establish a wired connection or a wireless connection with the server 12.

The terminals 11 include various terminals, such as a smart phone, a tablet computer, a smart wearable device, a desktop computer, a notebook computer, and the like. The quantity of terminals 11 is plural, and FIG. 1 shows a case where the quantity of the terminals 11 is 3, but it is not limited thereto. The computing capacity of each of the terminals 11 is usually weak compared with the server 12. The terminals 11 are able to run an application program, wherein the application program is built by a Flutter (an open source user interface building toolkit) technology. The application program is configured to acquire video data from the server 12 and send control information (such as a control signal) to the server 12.

The server 12 includes a server or a server cluster, and the server 12 has a powerful data processing capacity. The server 12 is provided with components therein, such as a UE model plug-in, wherein the components are capable of running various models. In addition, the server 12 is further provided with a video stream generating component, wherein the video stream generating component is capable of generating video data (video streams) in a Real Time Messaging Protocol (RTMP) format or a Real Time Streaming Protocol (RTSP) format.

Application scenarios of the method for controlling the model according to embodiments of the present disclosure is described below.

In an application scenario, the method for controlling the model according to embodiments of the present disclosure is defined to display three-dimensional models including a plurality of buildings (a building group) to a user, wherein the building group includes residential buildings, commercial blocks, office building groups, ancient building groups, or city models. By using the method according to embodiments of the present disclosure, the user conveniently and quickly knows information to be displayed by the three-dimensional model of the building group, such as appearances of all angles and patterns at specific details.

In another application scenario, the method for controlling the model according to embodiments of the present disclosure is defined to display three-dimensional models including consumer products to a user, wherein the consumer products include a mobile phone, a tablet computer, a smart wearable device, a desktop computer, a notebook computer, an automobile, a bicycle, a motorcycle, and the like. By using the method according to embodiments of the present disclosure, the user conveniently and quickly knows information to be displayed by the three-dimensional models of the consumer products, such as appearances of all angles and patterns at specific details.

Figure 2:
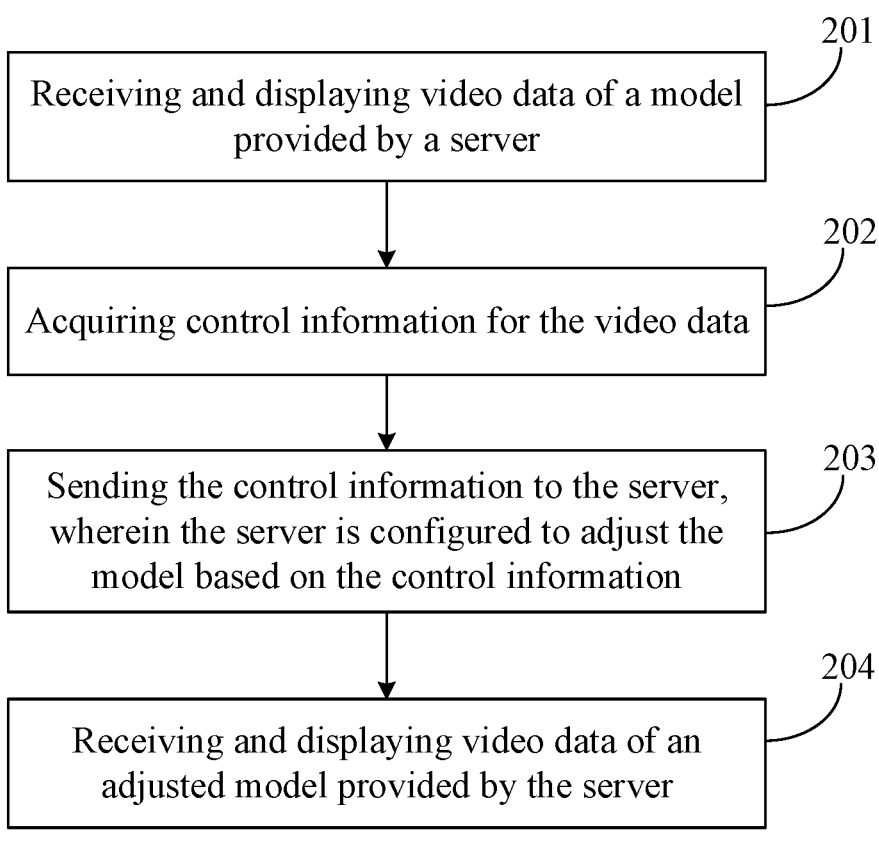
FIG. 2 is a flowchart of a method for controlling a model according to some embodiments of the present disclosure.

FIG. 2 is a flowchart of a method for controlling a model according to some embodiments of the present disclosure. The method is applicable to the terminal in the application scenario shown in FIG. 1, and the method includes the following processes.

In 201, video data of a model provided by the server is received and displayed.

In 202, control information for the video data is acquired.

In 203, the control information is sent to the server, wherein the server is configured to adjust the model based on the control information.

In 204, video data of an adjusted model provided by server is received and displayed.

In summary, in the method for controlling the model provided in the present disclosure, the video data of the model is provided for the terminal through the server. The terminal sends the control information for the video data to the server, such that the server adjusts the model and sends the video data of the adjusted model to the terminal, and the terminal displays the video data. In this way, a method in which the server runs and adjusts the model and the terminal displays and controls the model is achieved. And in the method according to the present disclosure, the model is run by the server, and the running process of the model is not limited by the function of the terminal, such that the problem that the control efficiency of a method for controlling a model in the related art is low is solved, and the effect of improving the control efficiency of the method for controlling the model is achieved.

Figure 3:
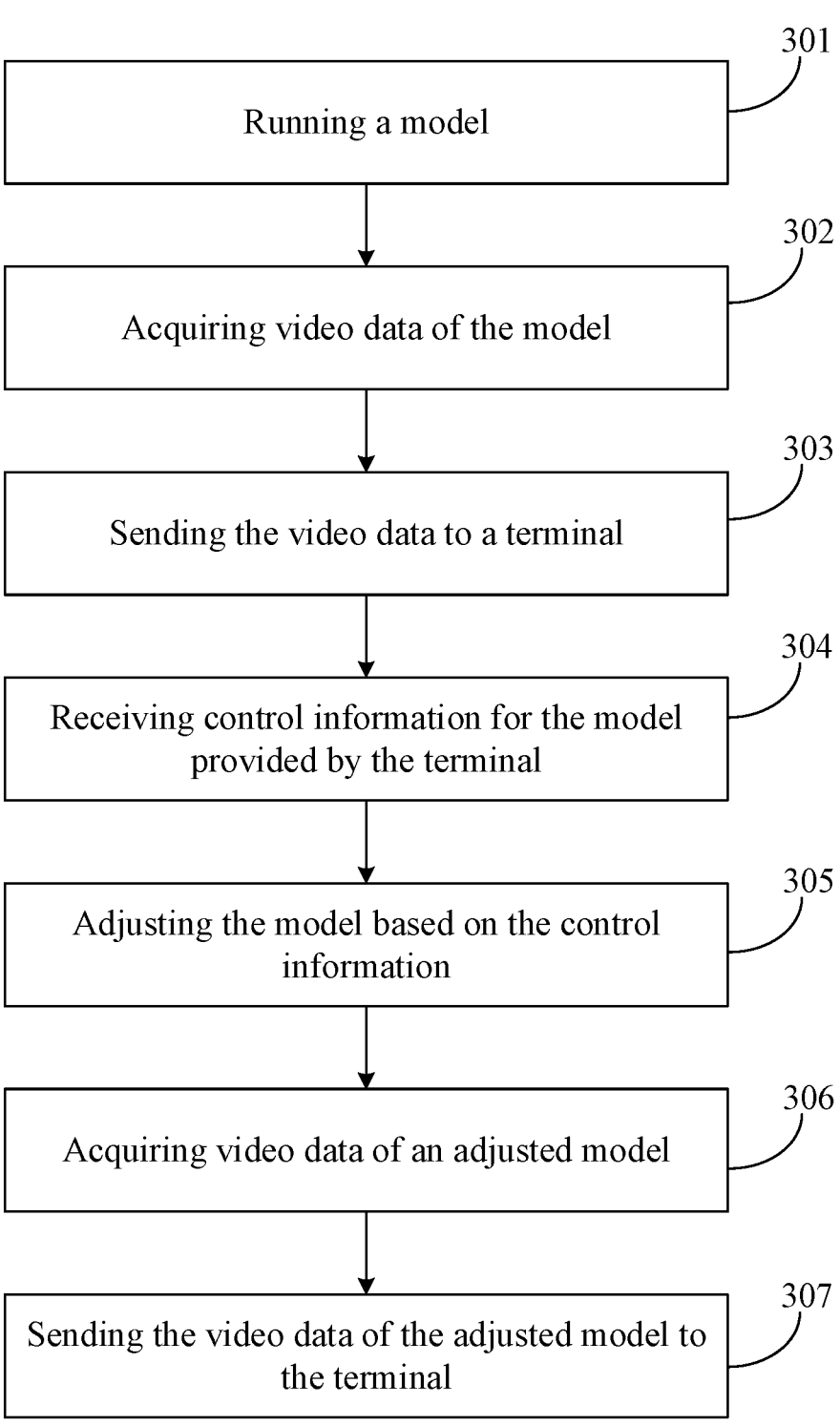
FIG. 3 is a flowchart of another method for controlling a model according to some embodiments of the present disclosure.

FIG. 3 is a flowchart of another method for controlling a model according to some embodiments of the present disclosure. The method is applicable to the server in the application scenario shown in FIG. 1, and the method includes the following processes.

In 301, a model is run.

In 302, video data of the model is acquired.

In 303, the video data is sent to a terminal.

In 304, control information for the model provided by the terminal is received.

In 305, the model is adjusted based on the control information.

In 306, video data of an adjusted model is acquired.

In 307, the video data of the adjusted model is sent to the terminal.

In summary, in the method for controlling the model provided in the present disclosure, the video data of the model is provided for the terminal through the server. The terminal sends the control information for the video data to the server, such that the server adjusts the model and sends the video data of the adjusted model to the terminal, and the terminal displays the video data. In this way, a method in which the server runs and adjusts the model and the terminal displays and controls the model is achieved. And in the method according to the present disclosure, the model is run by the server, and the running process of the model is not limited by the function of the terminal, such that the problem that the control efficiency of a method for controlling a model in the related art is low is solved, and the effect of improving the control efficiency of the method for controlling the model is achieved.

Figure 4:
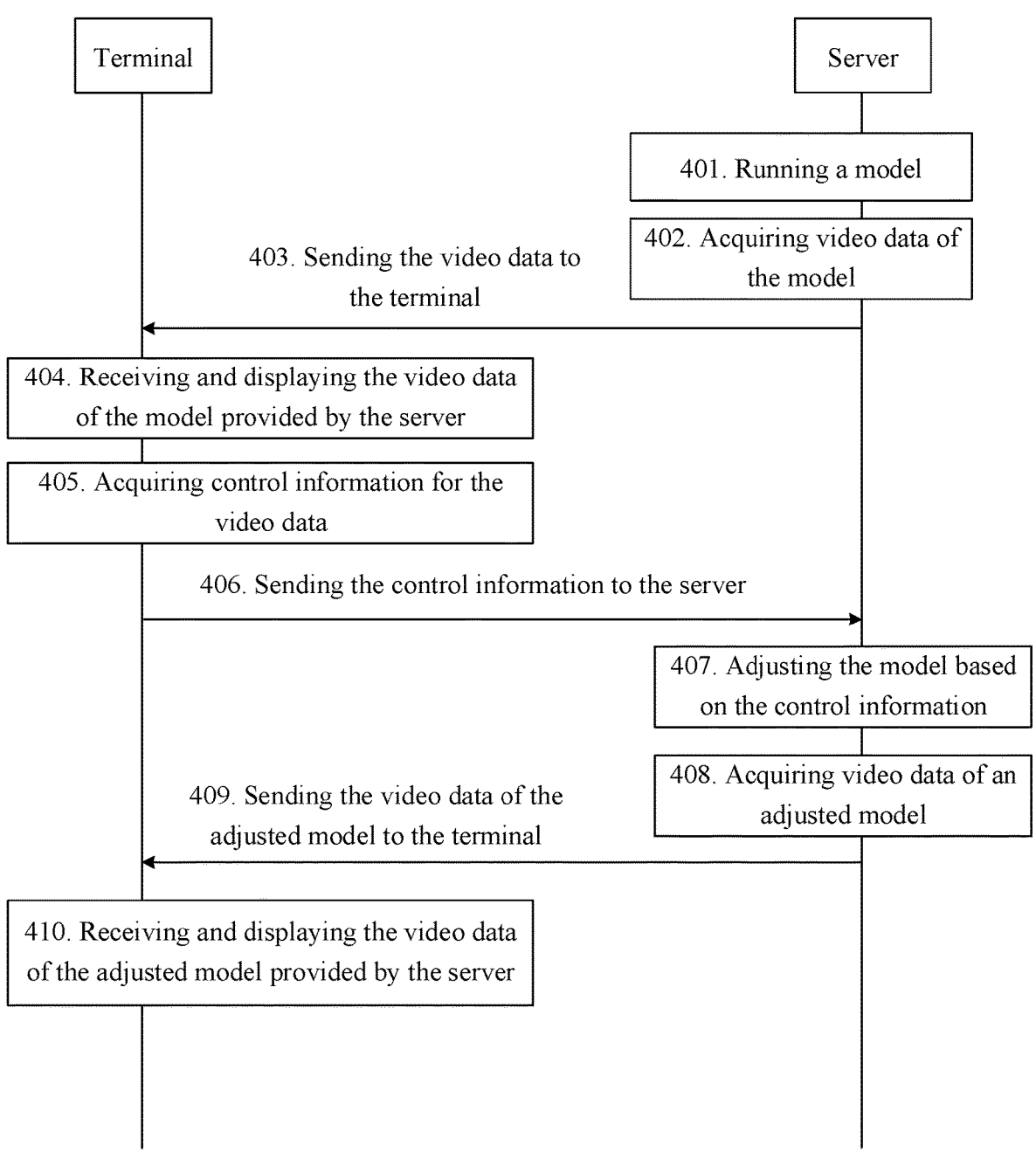
FIG. 4 is a flowchart of another method for controlling a model according to some embodiments of the present disclosure.

FIG. 4 is a flowchart of another method for controlling a model according to some embodiments of the present disclosure. The method is applicable to the application scenario shown in FIG. 1, and the method includes the following processes.

In 401, the server runs a model.

In response to applying the method according to embodiments of the present disclosure, the model is run by the server, wherein the model is predetermined in the server. In some embodiments, in a case that the model is a three-dimensional model, the server runs the model through a three-dimensional model running component (such as a UE model plug-in). Upon running the model, the model is adjusted under control of control information, such that the model is convenient to observe.

In 402, the server acquires video data of the model.

In response to running the model, the server begins collecting the video data of the model, wherein the video data is in a video stream form. In an exemplary embodiment, the server is provided with a video stream generating component, and the server generates video data in a Real Time Messaging Protocol (RTMP) format or video data in a Real Time Streaming Protocol (RTSP) format by using the video stream generating component.

In 403, the server sends the video data to the terminal.

The server sends the video data of the model to the terminal through a wireless connection or a wired connection with the terminal.

In 404, the terminal receives and displays the video data of the model provided by the server.

Upon receiving the video data of the model from the server, the terminal displays the video data of the model on a display interface.

Specifically, in 401, actions performed by the terminal include:

1) receiving the video data of the model provided by the server, and 2) playing the video data of the model by using a local player component.

Playing the video data of the model by using the local player component is only a video playing action, such that the requirement on the computing capacity of the terminal is weak, and the terminal is able to smoothly play the video data of the model.

Figure 5:
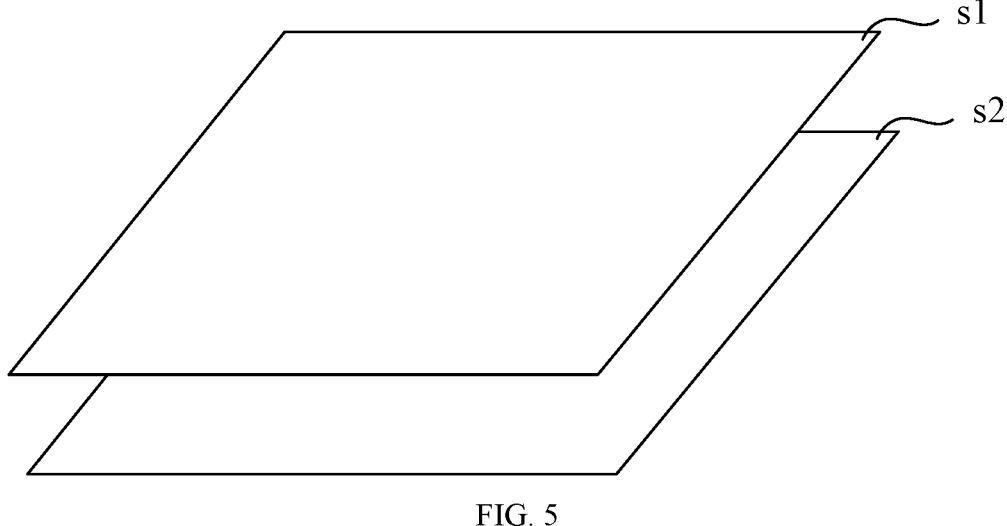
FIG. 5 is a schematic diagram of a structure of a player according to some embodiments of the present disclosure.

Referring to FIG. 5, FIG. 5 is a schematic diagram of a structure of a player according to some embodiments of the present disclosure. The player of the terminal is divided into an upper layer and a lower layer, wherein the lower layer s2 is a player capable of playing an RTMP/RTSP video stream, and the upper layer s1 is an interactive gesture capturing layer.

Two custom widgets (which are understood as components) are used in Flutter to implement the above two layers respectively. Upon the implementation, the above two layers are placed in a Stack component of the Flutter, wherein the interactive gesture capturing layer is the upper layer, the player is the lower layer. A pseudo code is:

```
Stack(children:[
    PlayerWidget( ),
    CaptureWidget( )
])
```

The meaning of the pseudo code is as follows: the Stack is a self-contained hierarchical component of the Flutter, a plurality of subcomponents are placed in the Stack, wherein the subcomponent PlayerWidget placed first is positioned at the lower layer, and the subcomponent CaptureWidget placed later is positioned at the upper layer.

In some embodiments, the terminal plays the video data by using a video playing component (such as PlayerWidget) in the Flutter, and acquires operation information of the user by using a touch component (such as CaptureWidget) in the Flutter.

In 405, the terminal acquires control information for the video data.

The control information is configured to adjust the video data.

Figure 6:
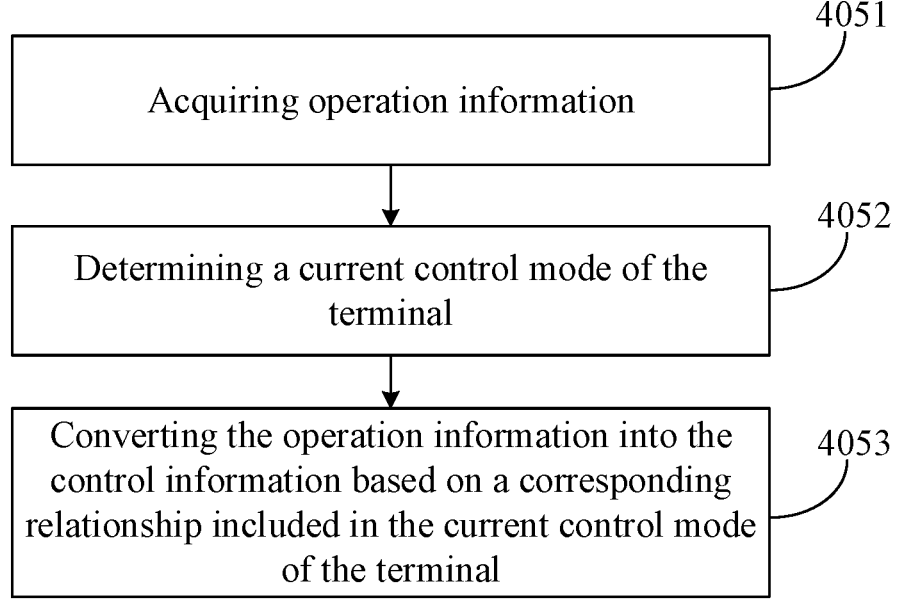
FIG. 6 is a schematic flowchart diagram of acquiring control information for video data according to some embodiments of the present disclosure.

In an exemplary embodiment, referring to FIG. 6, FIG. 6 is a schematic flowchart diagram of acquiring the control information for the video data according to some embodiments of the present disclosure, and the process 405 includes the following sub-processes.

In 4051, operation information is acquired.

The operation information is information generated in response to the user operating the terminal, and the terminal acquires the operation information in different fashions based on different control models. In the embodiments of the present disclosure, the fashion of acquiring the operation information by the terminal at least includes acquiring by using a mouse and acquiring by using a touch screen (or a touch pad).

In 4052, a current control mode of the terminal is determined.

The control mode at least includes a mouse control mode and a touch control mode, wherein both the mouse control mode and the touch control mode include a corresponding relationship between an operation information and a control information.

The sub-process 4052 at least includes the following execution actions.

1) Whether a position corresponding to the operation information belongs to a designated region is determined.

Figure 7:
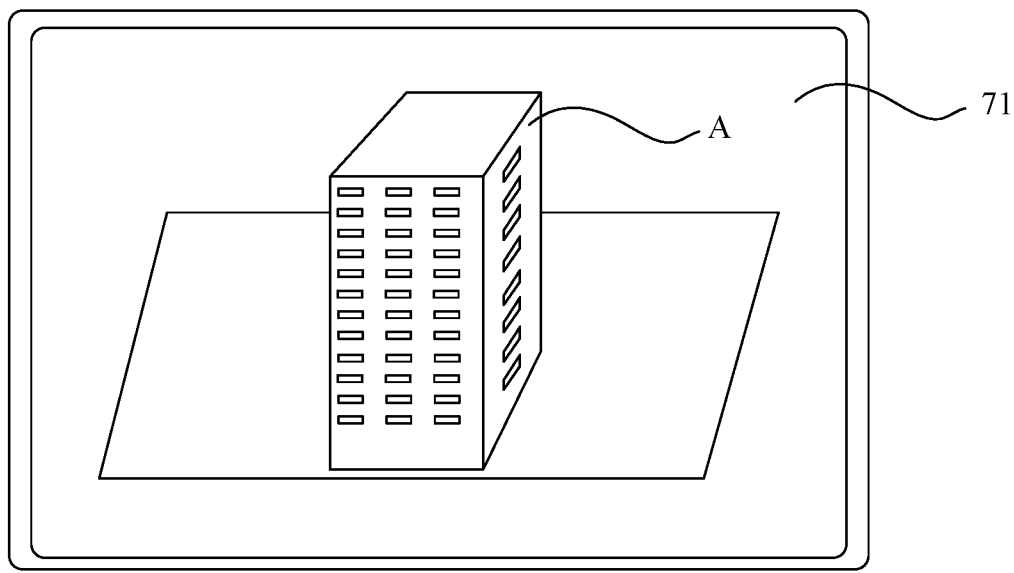
FIG. 7 is a schematic diagram of a display interface of a terminal according to some embodiments of the present disclosure.

The designated region refers to a designated region in a display interface of the terminal, and the designated region is related to the video data of the displayed model. In some embodiments, the designated region is a region where the model is located in the display interface, or an edge region of a display panel. The user determines the control mode by performing an operation on the designated region. In some embodiments, referring to FIG. 7, FIG. 7 is a schematic diagram of a display interface of a terminal according to some embodiments of the present disclosure. A model A is displayed in a display interface 71, wherein the model A is a three-dimensional model of a building. The designated region is a region occupied by the model A in the display interface 71. The terminal determines whether a position corresponding to the operation information of the user belongs to the designated region.

2) In response to a case that the position corresponding to the operation information does not belong to the designated region, the current control mode of the terminal is determined as the touch control mode.

In response to a case that the operation information of the user is not the operation information for the designated region, the terminal determines the current control mode as the touch control mode.

That is, upon the user performing touch control (touch control is performed by a finger or a stylus, and the touch control includes single click and double click) in a region other than the designated region in the display interface, the terminal determines the current control mode as the touch control mode.

3) In response to a case that the position corresponding to the operation information belongs to the designated region, the current control mode of the terminal is determined as the mouse control mode.

In response to a case that the operation information of the user is the operation information for the designated region, the terminal determines the current control mode as the mouse control mode.

That is, upon the user performing mouse control (the mouse control includes single click or double click on a left button, and single click or double click on a right button, and the like) in the designated region of the display interface by using the mouse, the terminal determines the current control mode as the mouse control mode.

In an exemplary embodiment, the terminal is controlled by using the mouse and the touch screen at the same time (for example, the terminal is a notebook computer with a touch screen), and the user operates the terminal in at least one of the control modes, or selects one of the control modes to operate the terminal.

In a specific implementation, a MouseRegion class of a Flutter framework is used, wherein an onEnter of the class is triggered on a device with a mouse. In response to the onEnter being triggered, it is indicated that the device uses the mouse operation mode. Processing based on the touch operation mode is performed in a default condition. A Flutter pseudo-code and principle schematic diagram includes:

```
CaptureWidget(
    Child:MouseRegion(
        onEnter( ){ //the mouse enters
    },
        onExit( ){ //the mouse exits
    }
        Child:Container( ),
    )
)
```

The CaptureWidget is a gesture capturing component. A subcomponent of the CaptureWidget is a MouseRegion, wherein the MouseRegion is configured to detect the mouse. In response to an input entering the MouseRegion (the MouseRegion is the above designated region), an onEnter ( ) function is triggered, and it is determined that the mouse is supported. A subcomponent of the MouseRegion is a Container. A size of an entire gesture capturing region is specified by determining a size of the Container.

In 4053, the operation information is converted into the control information based on the corresponding relationship included in the current control mode of the terminal.

Various operations performed by the user by using the mouse and the touch screen correspond to different control information. Different corresponding relationships are provided in different control modes.

In some embodiments, one corresponding relationship is shown in table 1.

TABLE 1

| Control information | Operation information of the mouse control mode (Windows/Mac/Linux/) | Operation information of the touch control mode (touch screen) |
|---|---|---|
| Single click | Single click on a left mouse button | Single click with a single finger |
| Double click | Double click on a left mouse button | Double click with a single finger |
| Translation | Drag a left mouse button | Drag with a single finger |
| Scaling | Mouse roller | Two fingers drag simultaneously and a space changes |
| Change a view angle of a camera | Press a right mouse button and move | Two fingers drag simultaneously, wherein one of the fingers is fixed at a fixed position and the other one of the fingers drags |

Table 1 shows the operation information of the mouse control mode (the mouse control mode is a control mode implemented in an operating system such as Windows/Mac/Linux) and the operation information of the touch control mode. Table 1 also shows the control information corresponding to the operation information. In some embodiments, operation information of a single click on the left mouse button by the user in the mouse control mode corresponds to control information of the single click, wherein the control information of the single click corresponds to a predetermined control mode, such as selecting the model, highlighting an edge of a selected model, or the like.

In an exemplary embodiment, the control information includes at least two control instructions. In some embodiments, each of the control information in Table 1 is a control instruction. The sub-process 4053 includes the following execution processes.

1) Whether the operation information corresponds to a first control instruction in the at least two control instructions is determined based on the corresponding relationship included in the current control mode of the terminal.

That is, the terminal compares the operation information with each of the control instructions in sequence in a circular determining fashion. In some embodiments, in response to the operation information received by the terminal in the mouse control mode being "drag a left mouse button," whether the operation information "drag a left mouse button" corresponds to the first control instruction "single click" is determined firstly based on the corresponding relationship described in table 1 from top to bottom. It is seen that the operation information corresponding to the first control instruction "single click" is "single click on a left mouse button", such that the operation information "drag a left mouse button" does not correspond to the first control instruction "single click."

2) In response to the operation information corresponding to the first control instruction, the operation information is converted into the first control instruction.

In response to the operation information corresponding to the first control instruction, the terminal converts the operation information into the first control instruction. In some embodiments, in response to the operation information received by the terminal in the mouse control mode being "single click on a left mouse button," whether the operation information "single click on a left mouse button" corresponds to the first control instruction "single click" is determined firstly based on the corresponding relationship described in table 1 from top to bottom. It is seen that the operation information corresponding to the first control instruction "single click" is "single click on a left mouse button", such that the operation information "single click on a left mouse button" corresponds to the first control instruction "single click", and the terminal converts the operation information "single click on a left mouse button" into the first control instruction "single click."

3) In response to the operation information not corresponding to the first control instruction, whether the operation information corresponds to a second control instruction in the at least two control instructions is determined.

In response to the operation information not corresponding to the first control instruction, the terminal continues to determine whether the operation information corresponds to the second control instruction in the at least two control instructions. The fashion of determining whether the operation information corresponds to the second control instruction is referred to the process of determining whether the operation information corresponds to the first control instruction in the at least two control instructions, which is not described herein again in the embodiments of the present disclosure.

4) In response to the operation information corresponding to the second control instruction, the operation information is converted into the second control instruction.

In response to the control information includes n control instructions, the terminal compares the operation information with the n control instructions in sequence until the comparison is successful. In a case that none of the n control instructions corresponds to an operation instruction, the terminal prompts the user that the operation information is not matched by displaying prompt information on an operation interface, or the terminal does not react. Specific collection fashions of the operation information provided in Table 1 is provided below, and please refer to Table 2.

TABLE 2

| Control information | Mouse control mode | Touch control mode |
|---|---|---|
| Single click | Using a Listener control, in a case that an onPointerDown program captures an event and does not capture a second event within a certain time interval (such as 300 milliseconds). | Using a GestureDector control, in a case that an onTap event is captured. |
| Double click | Using a Listener control, in a case that two events are captured in an onPointerDown within a certain time interval (less than 300 ms). | Using a GestureDector control, in a case that an onDoubleTap event is captured. |
| Translation | Using a Listener control, in a case that an onPointerMove event is triggered and a left mouse button is captured. | Using a GestureDector control, in a case that an onScaleUpdate is captured and pointerCount = 1 (wherein the pointerCount = 1 represents that only one finger is triggering an operation). |
| Scaling | Using a Listener control, in a case that an onPointSignal event is captured; and in response to scrollDelta being a positive number, amplification is performed, and in response to the scrollDelta being a negative number, scaling down is performed, and a scaling coefficient is the ScrollDelta. | Using a GestureDector control, in a case that onScaleUpdate is captured, and pointerCount = 2 (wherein the pointerCount-2 represents that two fingers are triggering an operation). |
| View angle change | Using a Listener control, in a case that an onPointerMove event is captured and a right mouse button is captured. | Using a GestureDector control, in a case that onLongPressStart is captured first, and onLongPressEnd is not triggered, it indicates that one of the fingers is long pressing; in this case, in response to onScaleUpdate being captured, it indicates that a movement of another finger is captured. |

The Listener, onPointerDown, onPointerMove, and scrollDelta in the above table are all programs applicable to mouse control, and the GestureDector, onTap, onDoub Tap, onScaleUpdate, onLongPressStart, and onLongPressEnd are all programs applicable to touch control, which are referred to the related art, and are not described in detail herein in the embodiments of the present disclosure.

In addition, a signal protocol in a JSON format is provided in the embodiments of the present disclosure, and please refer to table 3.

TABLE 3

| Control information | Signal protocol |
|---|---|
| Single click | ```{     "eventType":"click", //name of a current control information, the same as below     "x":1, //single click position x     "y":1, //single click position y     "width":1024, //screen width, the same as below     "height":768, //screen height, the same as below     "tick":1234543456 //click time } ``` |
| Double click | ```{     "eventType":"doubleClick",     "x":1, //double click position x     "y":1, //double click position y     "width":1024, //screen width     "height":768, //screen height     "tick":1234567865 } ``` |
| Translation (lens) | ```{     "eventType":"move",     "groupId":1, //groupIds of the same groups of move operations are the same     "xStart":1, //starting point x of a current movement     "yStart":1, //starting point y of the current movement     "xEnd":33, //end point x of the current movement     "yEnd":33, //end point y of the current movement     "width":1024, //screen width     "height":768, //screen height     "tick":1 } ``` |

TABLE 3-continued

| Control information | Signal protocol |
| --- | --- |
| View angle change | {<br>    "eventType":"rotate",<br>    "groupId":1,<br>    "xStart":1, //position x where a change of a view angle starts<br>    "yStart":1, //position y where the change of the view angle starts<br>    "xEnd":22, //position x where the change of the view angle ends<br>    "yEnd":22, //position y where the change of the view angle ends<br>    "width":1024, //screen width<br>    "height":768, //screen height<br>    "tick":1<br>} |
| View angle scaling | {<br>    "eventType":"scale",<br>    "x":1, //where a user performs scaling x<br>    "y":1,// where a user performs scaling y<br>    "groupId":1,<br>    "scale":0.2, //scaling coefficient, wherein amplification is peformed in response to the scaling coefficient being a positive number, and scaling down is performed in response to the scaling coefficient being a negative number<br>    "width":1024, //screen width<br>    "height":768, //screen height<br>    "tick":1<br>} |
| Other self-defined operations | {<br>    "function":[ a method name self-defined],<br>    "data":[ a data structure self-defined]<br>} |

The signal protocol is configured to define a format of the control information transmitted between the terminal and the server. Flutter, a cross-platform technology, provides some basic gesture capture components, such as GestureDetector. The GestureDector detects single click, double click, and the like, but is not flexible enough. The GestureDector is not suitable for specific control of a three-dimensional model (such as view angle change and view angle scaling), and is unable to be flexibly applied to different control modes. In the embodiments of the present disclosure, various control information is redefined, such that the control information is able to be conveniently applied to a scenario of controlling the three-dimensional model, thereby improving the applicability of the method for controlling the model provided in the embodiments of the present disclosure.

In 406, the terminal sends the control information to the server.

After the terminal acquires the control information corresponding to the operation information triggered by the user, the terminal sends the control information to the server through a wireless connection or a wired connection with the server, such that the server is able to control the model running in the server based on the control information. In some embodiments, the terminal controls that the information is encapsulated in the JSON format and transmits the information to the server through a network protocol (such as TCP, UDP, WebSocket, MQTT, and HTTP).

In an exemplary embodiment, the terminals provided in the embodiments of the present disclosure includes a plurality of terminals, and the plurality of terminals all send the control information to the server through processes 401 to 406. In an optional implementation, the plurality of terminals control different models respectively. In another optional implementation, the plurality of terminals control the same model, which is not limited in the embodiments of the present disclosure.

The server receives the control information for the model running in the server from the terminals. In an exemplary embodiment, the terminals at least include a first terminal and a second terminal, and the server receives first control information for the model from the first terminal and second control information for the model from the second terminal. The server receives the first control information and the second control information sequentially, or receives the first control information and the second control information simultaneously, which is not limited in the embodiments of the present disclosure.

In the embodiments of the present disclosure, an application program (client) is running in the terminal, and the application program is realized by adopting a cross-platform Flutter technology. The application program is applicable to various platforms, such as a Windows end, an Android end, an iOS end and a PC browser end. In some embodiments, the application program applying the Flutter technology displays the display interface shown in FIG. 7, and the user inputs the control information for the model in the display interface of the application program.

In 407, the server adjusts the model based on the control information.

The server adjusts the model based on the control information provided by the terminal.

In the case that the server receives the first control information for the model from the first terminal and the second control information for the model from the second terminal, the server adjusts the model based on the first control information provided by the first terminal and the second control information provided by the second terminal.

In an exemplary embodiment, the server adjusts the model in sequence based on the sequence of the received control information. For example, upon receiving the first control information from the first terminal first, the server adjusts the model based on the first control information first. And then the server receives the second control information from the second terminal, the server continues to adjust the model based on the second control information.

In another exemplary embodiment, in a scenario where the plurality of terminals collectively control the model in the server, the server adjusts the model through processes 407 to 409.

In 408, the server acquires video data of an adjusted model.

Similar to process 402, the server acquires the video data of the adjusted model.

In 409, the server sends the video data of the adjusted model to the terminal.

The server sends the video data of the model to the terminal through a wireless connection or a wired connection with the terminal.

In the scenario where the plurality of terminals collectively control the model in the server, the server sends the video data of the adjusted model to the plurality of terminals.

In 410, the terminal receives and displays the video data of the adjusted model provided by the server.

The terminal displays the video data on the display interface upon receiving the video data of the adjusted model from the server. In this way, the function of the model display and the model adjustment on the terminal side is achieved, the terminal does not need to directly operate and adjust the model, the functional requirements on the terminal are greatly reduced, the display and the control of the complex model on the terminal are facilitated, and the user experience is improved.

In the case that the server sends the video data of the adjusted model to the plurality of terminals, the plurality of terminals receives the same video data of the adjusted model, such that the function of simultaneously displaying the model and controlling the model on the plurality of terminals is realized.

In summary, in the method for controlling the model provided in the present disclosure, the video data of the model is provided for the terminal through the server. The terminal sends the control information for the video data to the server, such that the server adjusts the model and sends the video data of the adjusted model to the terminal, and the terminal displays the video data. In this way, the method in which the server runs and adjusts the model and the terminal displays and controls the model is achieved. In addition, in the method provided in the present disclosure, the model is run by the server, which is not limited by the function of the terminal, such that the problem that the control efficiency of the method for controlling a model in the related art is low is solved, and the effect of improving the control efficiency of the method for controlling the model is achieved.

A user is able to observe and control the model smoothly at the terminal, such that user experience is better.

Figure 8:
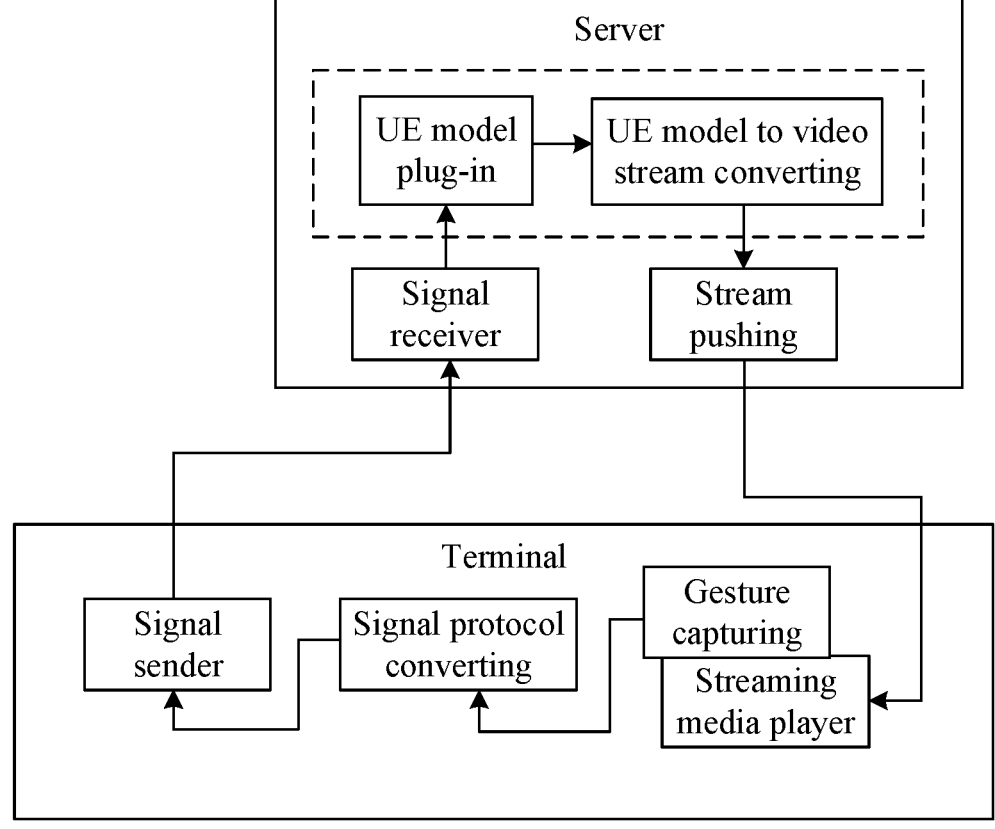
FIG. 8 is a schematic structural diagram of a method for controlling a model according to some embodiments of the present disclosure.

Referring to FIG. 8, FIG. 8 is a schematic structural diagram of a method for controlling a model according to some embodiments of the present disclosure. A server includes a UE model plug-in, a UE model to video stream converting module, a stream pushing module, and a signal receiver. A terminal includes a gesture capturing module in a player, a streaming media player module, a signal protocol converting module, and a signal sender.

In a case that the method provided in the present disclosure is applied, the UE model plug-in the server runs a model, a video stream is acquired by using the UE model to video stream converting module, and the video stream is pushed to the terminal by the stream pushing module. The terminal plays the video stream through a streaming media player, and acquires the control information of a user by using the gesture capturing module. Then, the terminal converts the control information into a signal with a predetermined format by using the signal protocol converting module and sends the signal to the server by using the signal sender. The signal receiver in the server receives the signal and sends the signal to the UE model plug-in to adjust the model.

The following are apparatus embodiments of the present disclosure. The apparatus is configured to perform the method embodiments of the present disclosure. For details that are not disclosed in the apparatus embodiments of the present disclosure, reference is made to the method embodiments of the present disclosure.

Figure 9:
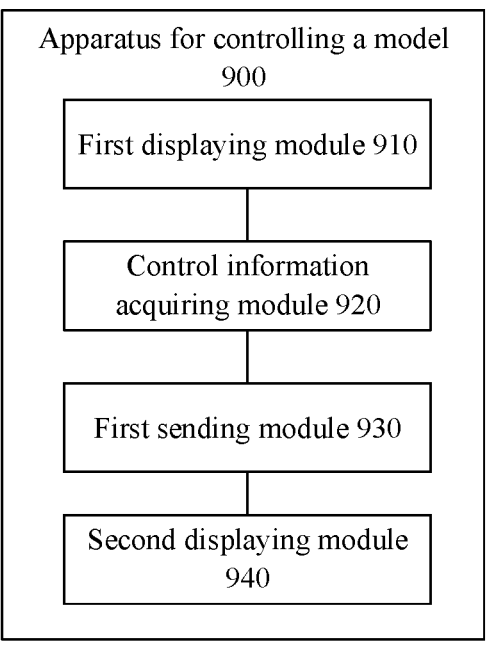
FIG. 9 is a block diagram of an apparatus for controlling a model according to some embodiments of the present disclosure.

Referring to FIG. 9, FIG. 9 is a block diagram of an apparatus for controlling a model according to some embodiments of the present disclosure. The apparatus is partially or wholly incorporated in the terminal in the application scenario shown in FIG. 1, and the apparatus 900 includes:

> a first displaying module 910, configured to receive and display video data of a model provided by a server;
> a control information acquiring module 920, configured to acquire control information for the video data;
> a first sending module 930, configured to send the control information to the server, wherein the server is configured to adjust the model based on the control information; and
> a second displaying module 940, configured to receive and display video data of an adjusted model provided by the server.

In summary, in the apparatus for controlling the model provided in the present disclosure, the video data of the model is provided for the terminal through the server. The terminal sends the control information for the video data to the server, such that the server adjusts the model and sends the video data of the adjusted model to the terminal, and the terminal displays the video data. In this way, the method in which the server runs and adjusts the model and the terminal displays and controls the model is achieved. And in the method, the model is run by the server, which is not limited by the function of the terminal, such that the problem that the control efficiency of a method for controlling a model in the related art is low is solved, and the effect of improving the control efficiency of the method for controlling the model is achieved.

Figure 10:
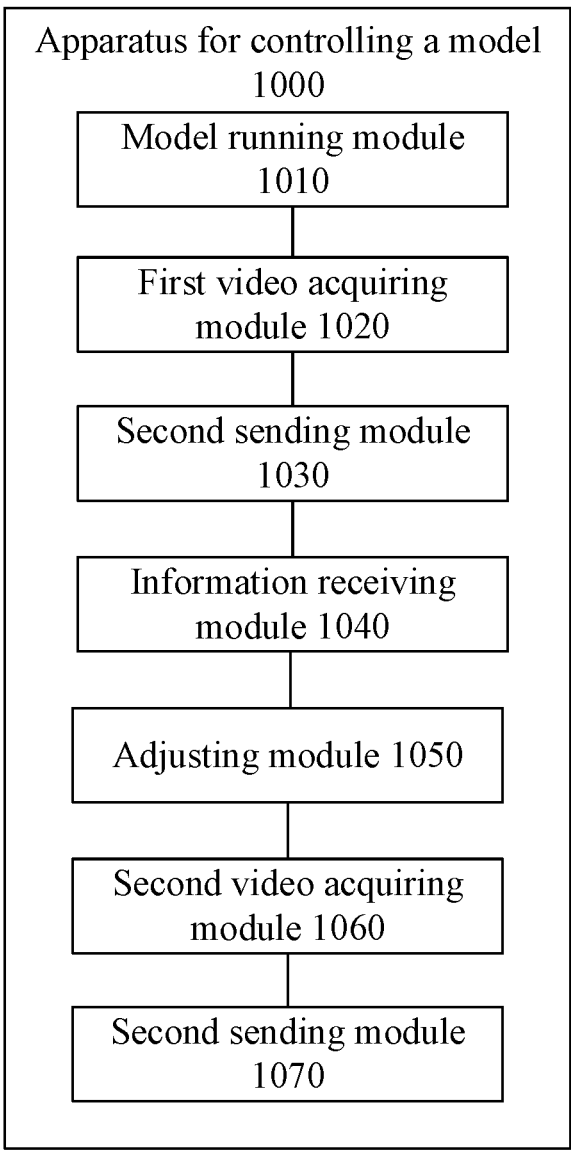
FIG. 10 is a block diagram of another apparatus for controlling a model according to some embodiments of the present disclosure.

Referring to FIG. 10, FIG. 10 is a block diagram of another apparatus for controlling a model according to some embodiments of the present disclosure. The apparatus is partially or wholly incorporated in the server in the application scenario shown in FIG. 1, and the apparatus 1000 includes:

> a model running module 1010, configured to run a model;
> a first video acquiring module 1020, configured to acquire video data of the model;
> a second sending module 1030, configured to send the video data to a terminal;
> an information receiving module 1040, configured to receive control information for the model provided by the terminal;
> an adjusting module 1050, configured to adjust the model based on the control information;
> a second video acquiring module 1060, configured to acquire video data of an adjusted model; and
> a second sending module 1070, configured to send the video data of the adjusted model to the terminal.

In summary, in the apparatus for controlling the model provided in the present disclosure, the video data of the model is provided for the terminal through the server. The terminal sends the control information for the video data to the server, such that the server adjusts the model and sends the video data of the adjusted model to the terminal, and the terminal displays the video data. In this way, the method in which the server runs and adjusts the model and the terminal displays and controls the model is achieved. And in the method, the model is run by the server, which is not limited by the function of the terminal, such that the problem that the control efficiency of a method for controlling a model in the related art is low is solved, and the effect of improving the control efficiency of the method for controlling the model is achieved.

Figure 11:
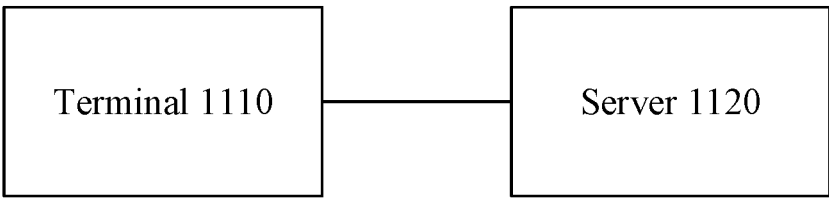
FIG. 11 is a block diagram of a system for controlling a model according to some embodiments of the present disclosure.

FIG. 11 is a block diagram of a system for controlling a model according to some embodiments of the present disclosure. The system includes: a terminal 1110 and a server 1120.

The server 1120 is configured to run a model.

The server 1120 is further configured to acquire video data of the model.

The server 1120 is further configured to send the video data to the terminal 1110.

The terminal 1110 is configured to receive and display the video data of the model provided by the server 1120.

The terminal 1110 is further configured to acquire control information for the video data.

The terminal 1110 is further configured to send the control information to the server 1120.

The server 1120 is further configured to receive the control information for the model provided by the terminal 1110.

The server 1120 is further configured to adjust the model based on the control information.

The server 1120 is further configured to acquire video data of an adjusted model.

The server 1120 is further configured to send the video data of the adjusted model to the terminal 1110.

The terminal 1110 is further configured to receive and display the video data of the adjusted model provided by the server 1120.

In summary, in the system for controlling the model provided in the present disclosure, the video data of the model is provided for the terminal through the server. The terminal sends the control information for the video data to the server, such that the server adjusts the model and sends the video data of the adjusted model to the terminal, and the terminal displays the video data. In this way, the method in which the server runs and adjusts the model and the terminal displays and controls the model is achieved. And in the method, the model is run by the server, which is not limited by the function of the terminal, such that the problem that the control efficiency of a method for controlling a model in the related art is low is solved, and the effect of improving the control efficiency of the method for controlling the model is achieved.

In addition, a device for controlling a model is provided in the embodiments of the present disclosure. The device includes a processor, and a memory storing at least one instruction, at least one program, a code set, or an instruction set therein, wherein the at least one instruction, the at least one program, the code set, or the instruction set, when loaded and executed by the processor, causes the processor to perform the above method for controlling the model.

A non-transitory computer storage medium is provided in the embodiments of the present disclosure. The non-transitory computer storage medium stores at least one instruction, at least one program, a code set, or an instruction set therein, wherein the at least one instruction, the at least one program, the code set, or the instruction set, when loaded and executed by a processor, causes the processor to perform the above method for controlling the model.

A computer program product or a computer program is provided in the embodiments of the present disclosure. The computer program product or a computer program includes computer instructions. The computer instructions are stored in a computer readable storage medium. A processor of a computer device reads the computer instructions from the computer readable storage medium, and executes the computer instructions, such that the computer device performs the above method for controlling the model.

In the present disclosure, the term "at least one of A and B" merely describes an association relationship of associated objects and indicates that three relationships present. For example, at least one of A and B indicates that: only A is present, both A and B exist are present, and only B is present. Similarly, "at least one of A, B, and C" indicates that seven relationships present and indicates that: only A is present, only B is present, only C is present, both A and B are present, both A and C are present, both C and B are present, and A, B, and C are all present. Similarly, "at least one of A, B, C, and D" indicates that fifteen relationships present and indicates that: only A is present, only B is present, only C is present, only D is present, both A and B are present, both A and C are present, both A and D are present, both C and B are present, both D and B are present, both C and D are present, A, B, and C are all present, A, B, and D are all present, A, C, and D are all present, B, C, and D are all present, and A, B, C, and D are all present.

In the present disclosure, the terms "first," "second," "third," and "fourth" are merely used for descriptive purposes and are not construed as indicating or implying relative importance. The term "a plurality of" refers to two or more, unless otherwise explicitly defined.

In the several embodiments provided in the present disclosure, it is understood that the disclosed apparatus and method are implementable in other manners. For example, the above-described apparatus embodiments are merely illustrative. For example, the division of the units is only one type of logical functional division, and other divisions are realizable in practice. For example, a plurality of units or components are combined or integrated into another system, or some features are omitted, or not executed. In addition, the shown or discussed mutual coupling or direct coupling or communication connection are an indirect coupling or communication connection through some interfaces in some embodiments. And the indirect coupling or communication connection between the apparatuses or units is realized in an electrical, mechanical or other form.

In some embodiments, the units described as separate parts are physically separate or are not physically separate. Parts displayed as units are physical units or are not physical units, that is, the parts are located in one position or distributed on a plurality of network units. In some embodiments, some or all of the units are selected based on actual needs to achieve the purpose of the solutions of the embodiments.

It is appreciated by those of ordinary skill in the art that all or a part of the processes for implementing the above embodiments are completed by hardware, or completed by instructing relevant hardware by a program stored in a computer readable storage medium. The storage medium mentioned above is a read-only memory, a magnetic disk, an optical disk, or the like.

Described above are merely optional embodiments of the present disclosure and are not intended to limit the present disclosure. Any modifications, equivalents, improvements, and the like, made within the spirit and principle of the present disclosure fall within the protection scope of the present disclosure.

What is claimed is:

1. A method for controlling a model, wherein the method is applicable to a terminal and the method comprises:

receiving and displaying video data of a model provided by a server;

acquiring control information for the video data;

sending the control information to the server, wherein the server is configured to adjust the model based on the control information; and receiving and displaying video data of an adjusted model provided by the server, wherein acquiring the control information for the video data comprises:

acquiring operation information;

determining a current control mode of the terminal, wherein the control mode at least comprises a mouse control mode and a touch control mode, both the mouse control mode and the touch control mode comprising a corresponding relationship between an operation information and a control information; and converting the operation information into the control information based on the corresponding relationship comprised in the current control mode of the terminal, wherein determining the current control mode of the terminal comprises:

determining whether a position corresponding to the operation information belongs to a designated region;

in response to a case that the position corresponding to the operation information does not belong to the designated region, determining the current control mode of the terminal as the touch control mode; and in response to a case that the position corresponding to the operation information belongs to the designated region, determining the current control mode of the terminal as the mouse control mode, wherein the designated region is a region occupied by the model in a display interface of the terminal.

2. The method according to claim 1, wherein the control information comprises at least two control instructions, and the converting the operation information into the control information based on the corresponding relationship comprised in the current control mode of the terminal comprises:

determining, based on the corresponding relationship comprised in the current control mode of the terminal, whether the operation information corresponds to a first control instruction in the at least two control instructions;

in response to the operation information corresponding to the first control instruction, converting the operation information into the first control instruction;

in response to the operation information not corresponding to the first control instruction, determining whether the operation information corresponds to a second control instruction in the at least two control instructions; and in response to the operation information corresponding to the second control instruction, converting the operation information into the second control instruction.

3. The method according to claim 2, wherein the control information comprises at least two control instructions of single click, double click, view angle translation, view angle scaling, and view angle change.

4. The method according to claim 1, wherein receiving and displaying the video data of the model provided by the server comprises:

receiving the video data of the model provided by the server; and playing the video data of the model through a local player component.

5. A method for controlling a model, wherein the method is applicable to a server and the method comprises:

running a model;

acquiring video data of the model;

sending the video data to a terminal;

receiving control information for the model provided by the terminal;

adjusting the model based on the control information;

acquiring video data of an adjusted model; and sending the video data of the adjusted model to the terminal, wherein the control information is acquired by the terminal by:

acquiring operation information;

determining a current control mode of the terminal, wherein the control mode at least comprises a mouse control mode and a touch control mode, both the mouse control mode and the touch control mode comprising a corresponding relationship between an operation information and a control information; and converting the operation information into the control information based on the corresponding relationship comprised in the current control mode of the terminal, wherein determining the current control mode of the terminal comprises:

determining whether a position corresponding to the operation information belongs to a designated region;

in response to a case that the position corresponding to the operation information does not belong to the designated region, determining the current control mode of the terminal as the touch control mode; and in response to a case that the position corresponding to the operation information belongs to the designated region, determining the current control mode of the terminal as the mouse control mode, wherein the designated region is a region occupied by the model in a display interface of the terminal.

6. The method according to claim 5, wherein the model is a three-dimensional model, and the running the model comprises:

running the model by a three-dimensional model running component.

7. The method according to claim 5, wherein the server receives the control information from a plurality of terminals, and the terminals at least comprise a first terminal and a second terminal, and the adjusting the model based on the control information comprises:

adjusting the model based on first control information provided by the first terminal and second control information provided by the second terminal.

8. The method according to claim 7, wherein the first terminal and the second terminal are terminals of different operating systems.

9. A system for controlling a model, wherein the system comprises: a terminal and a server;

the server is configured to run a model;

the server is further configured to acquire video data of the model;

the server is further configured to send the video data to the terminal;

the terminal is configured to receive and display the video data of the model provided by the server;

the terminal is further configured to acquire control information for the video data;

the terminal is further configured to send the control information to the server;

the server is further configured to receive the control information for the model provided by the terminal;

the server is further configured to adjust the model based on the control information;

the server is further configured to acquire video data of an adjusted model;

the server is further configured to send the video data of the adjusted model to the terminal; and the terminal is further configured to receive and display the video data of the adjusted model provided by the server, wherein acquire the control information for the video data comprises:

acquire operation information;

determine a current control mode of the terminal, wherein the control mode at least comprises a mouse control mode and a touch control mode, both the mouse control mode and the touch control mode comprising a corresponding relationship between an operation information and a control information; and convert the operation information into the control information based on the corresponding relationship comprised in the current control mode of the terminal, wherein determine the current control mode of the terminal comprises:

determine whether a position corresponding to the operation information belongs to a designated region;

in response to a case that the position corresponding to the operation information does not belong to the designated region, determine the current control mode of the terminal as the touch control mode; and in response to a case that the position corresponding to the operation information belongs to the designated region, determine the current control mode of the terminal as the mouse control mode, wherein the designated region is a region occupied by the model in a display interface of the terminal.

10. A device for controlling a model, comprising:

a processor; and a memory storing at least one instruction, at least one program, a code set, or an instruction set therein;

wherein the at least one instruction, the at least one program, the code set, or the instruction set, when loaded and executed by the processor, causes the processor to perform the method as defined in claim 1.

11. A non-transitory computer storage medium, storing at least one instruction, at least one program, a code set, or an instruction set therein, wherein the at least one instruction, the at least one program, the code set, or the instruction set, when loaded and executed by a processor, causes the processor to perform the method as defined in claim 1.

12. The device according to claim 10, wherein the control information comprises at least two control instructions, and the at least one instruction, the at least one program, the code set, or the instruction set, when loaded and executed by the processor, causes the processor to perform:

determining, based on the corresponding relationship comprised in the current control mode of the terminal, whether the operation information corresponds to a first control instruction in the at least two control instructions;

in response to the operation information corresponding to the first control instruction, converting the operation information into the first control instruction;

in response to the operation information not corresponding to the first control instruction, determining whether the operation information corresponds to a second control instruction in the at least two control instructions; and in response to the operation information corresponding to the second control instruction, converting the operation information into the second control instruction.

13. A device for controlling a model, comprising:

a processor; and a memory storing at least one instruction, at least one program, a code set, or an instruction set therein;

wherein the at least one instruction, the at least one program, the code set, or the instruction set, when loaded and executed by the processor, causes the processor to perform the method as defined in claim 5.

14. The device according to claim 13, wherein the model is a three-dimensional model, and the at least one instruction, the at least one program, the code set, or the instruction set, when loaded and executed by the processor, causes the processor to perform:

running the model by a three-dimensional model running component.

15. The device according to claim 13, wherein the server receives the control information from a plurality of terminals, and the terminals at least comprise a first terminal and a second terminal, and the at least one instruction, the at least one program, the code set, or the instruction set, when loaded and executed by the processor, causes the processor to perform:

adjusting the model based on first control information provided by the first terminal and second control information provided by the second terminal.

16. A non-transitory computer storage medium, storing at least one instruction, at least one program, a code set, or an instruction set therein, wherein the at least one instruction, the at least one program, the code set, or the instruction set, when loaded and executed by a processor, causes the processor to perform the method as defined in claim 5.

* * * * *